UNITED STATES PATENT OFFICE.

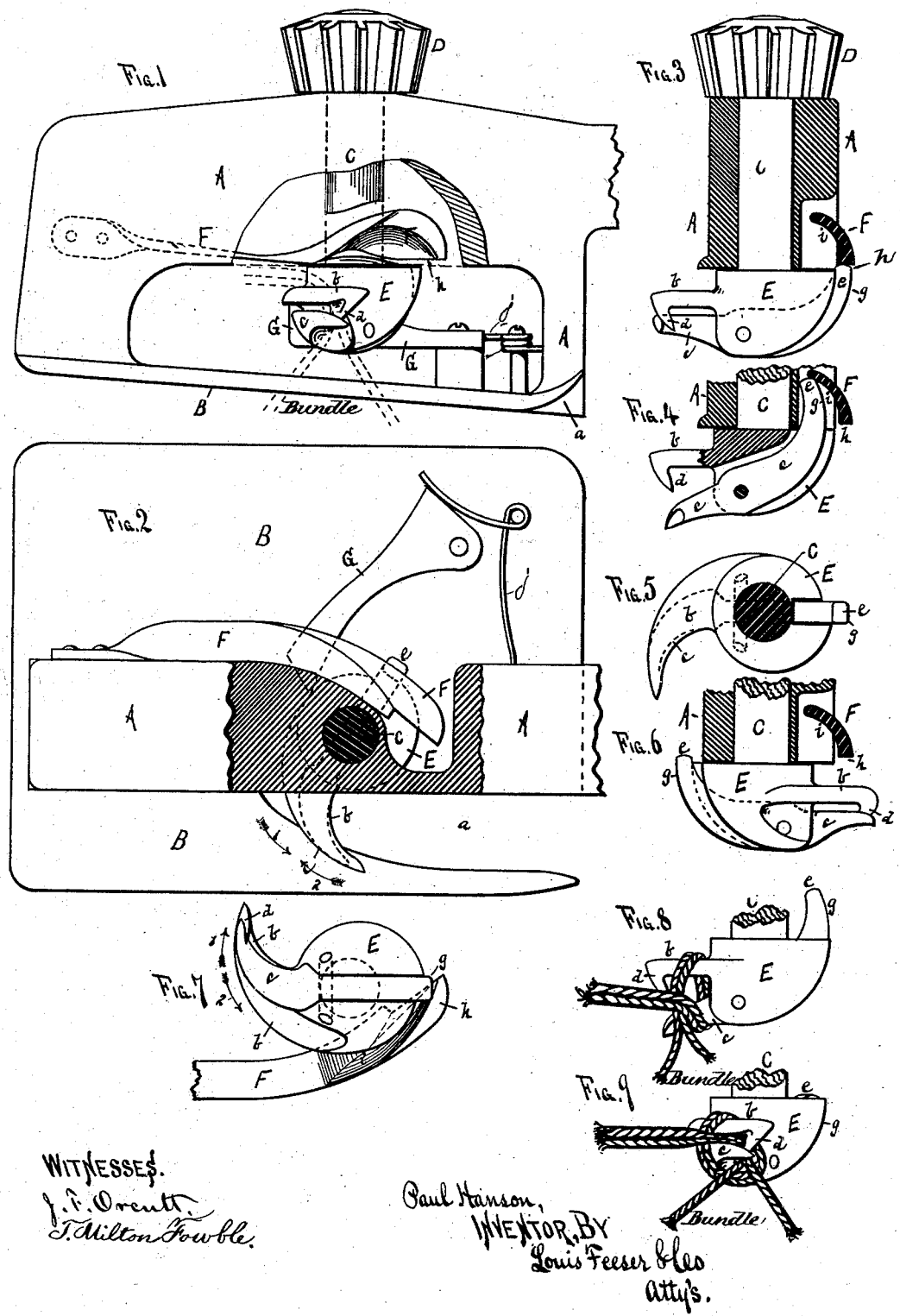

PAUL HANSON, OF ROCHESTER, MINNESOTA.

KNOT-TYER FOR GRAIN-BINDERS.

SPECIFICATION forming part of Letters Patent No. 257,573, dated May 9, 1882.

Application filed November 25, 1881. (Model.)

*To all whom it may concern:*

Be it known that I, PAUL HANSON, a citizen of the United States, and a resident of Rochester, in the county of Olmsted and State of Minnesota, have made certain new and useful Improvements in Knot-Tyers for Grain-Binders, of which the following is a specification.

This invention relates to the mechanism by which the knot is tied in the cord encircling the bundles in grain-binders; and it consists in a revolving hook adapted to be reversed to draw the cut ends through the loop and cast the loop off, and provided with a movable jaw and a fixed jaw, said movable jaw adapted to be opened at the proper point in the revolution of the hook to receive the cord between the jaws, and then be closed and revolved backward to draw the ends through the loop and held closed until the knot is completed and cast off, as hereinafter shown. I attain these objects by the use of the mechanism illustrated in the accompanying drawings, in which—

Figure 1 is a side view. Fig. 2 is a top plan view, partially in section; and Fig. 3 is a rear elevation, partially in section, of the binder-hook and a portion of the frame. Fig. 4 is a sectional view of the binder-hook and operating-spring, showing the movable jaw open. Fig. 5 is a top plan view of the binder-hook. Fig. 6 is a side view of the binder-hook from the opposite side of Figs. 3 and 4. Fig. 7 is a bottom plan view of the binder-hook and a portion of the operating-spring detached; Figs. 8 and 9, views of the binder-hook, illustrating the manner of forming the knot.

This invention is intended to be used more especially on the form of binder shown in my application for a patent filed June 28, 1881, No. 36,755, but may be applied to other forms; and it consists in a frame, A, made in any desired manner, and with a guard-plate, B, beneath which the gavel of grain is run by the packers, and in which a slot, *a*, (see Fig. 2,) is formed, through which the cords pass to the binding-hook, as shown in dotted lines in Fig. 1.

In the frame A is an upright shaft, C, having a pinion, D, on its upper end above the frame, and the binding-hook on its lower end, between the frame A and guard B, as shown in Figs. 1 and 3, the said pinion being adapted to be revolved or turned back and forth, as shown in my application for a patent above referred to, to give the necessary motion to the binding-hook.

The binding-hook consists of a large irregular hemispherical head, E, from the upper part of which projects a curved hook or jaw, *b*, at right angles to the shaft C, and in a slot in the head, in its lower part, is pivoted another curved hook or jaw, *c*, somewhat similar to the hook *b*, and lying just beneath and a short distance from it.

The hook *b* is provided at its outer point with a downwardly-extending and backwardly-slanting barb, *d*, whose lower part lies against and inside of the movable jaw *c*, as shown. The rear part of the hook *c* is made to nearly conform to the rear surface of the head E, but has a heel which projects a short distance beyond it, so that if the heel *g* be pressed downward the point of the movable jaw *c* will be held up against the barbed point of the fixed jaw *b*, as shown in Figs. 1, 3, 6, and 9; but if the heel *g* of the pivoted hook *c* be pushed inward the movable jaw will be drawn away from the fixed jaw *b*, as shown in Figs. 4 and 8.

Attached to the frame A, and running along and curving inward toward the head and into a recess in the frame and lying partially above the head E, (see Figs. 2, 3, 4, 6, and 7,) is a spring, F, having a flat portion, *h*, at its outer end on the lower side, and a curved recessed cam-surface, *i*, between said flat portion *h* and the head E. (See Figs. 3, 4, 6, and 7.) When the shaft C is revolved in the direction of the arrow No. 1, Fig. 2, the heel *g* of the hook *c* will pass behind the curved cam-surface *i* of the spring F, and be forced inward and open the jaw *c*, as shown in Figs. 4 and 8, and then, when the motion of the shaft C is reversed, the point *e* of the heel *g* will pass beneath the flat portion *h* and hold the movable jaw *c* up against the fixed jaw *b*, as shown in Figs. 1, 3, 6, and 9. By this means, when the shaft C is revolved in the direction of arrow No. 1, the jaws of the knotter-hook will be opened while the heel *g* of the movable jaw is passing the cam-surface *i*, and closed when the point *e* of the heel *g* is passing beneath the flat portion *h* of the spring F in the direction of arrow No. 2. Figs. 3 and 4 illustrate this action, Fig. 3 showing the point *e* of the heel beneath the flat portion $h$, and Fig. 4 showing the heel $g$ behind the cam-surface $i$.

The dog G is pivoted to the guard-plate B, and a spring, $j$, as shown in Fig. 2, bears against its rear end, so as to keep its point in contact with the hooks, the purpose thereof being to push the cord from off the hook, as hereinafter described.

In Fig. 6 the opposite side of the hooks $b$ $c$ and head E is shown, illustrating the manner of constructing them.

The action of forming the knot is the same as that shown in my application for a patent above referred to, consisting in revolving the knotter in the direction of arrow No. 1 until the portion of the cord lying between the knotter and the ordinary cord-holder (not shown) is folded across the portion of cord lying between the hook $b$ and the slot in the plate, and the jaws having been opened during this revolution by the heel passing behind the cam-surface $i$, and the revolution still progressing, the cord, which has been folded across the band portion, passes between the open jaws, when the jaws close and the ends of the cord held in the holder are cut, and the knotter begins its reverse movement, drawing the ends through the loop, and the loop being pushed off the knotter by the dog G, as in my application above referred to, the loop being still held by the extreme points of the jaws until the bundle is forced out by the kicker-arms of the binder, when the loop will be pulled from between the jaws, the spring F being strong enough to hold the cord from slight strains, but "giving" sufficiently to allow the loop to be removed when the whole weight of the bundle comes upon it.

The spring F also adapts the knotter to large or small cords, as it will "give" sufficiently to permit large cords to enter and press close enough to hold small cords.

What I claim as new is—

1. The knotter consisting of the head E, having the fixed barbed jaw $b$ and the pivoted jaw $c$, in combination with the spring F, having the cam-surface $i$ and a flat portion, $h$, adapted to act upon the jaw $c$ to open it when the knotter is revolved in one direction and to close it when the knotter is reversed, substantially as set forth.

2. The knotter consisting of the head E, having the fixed barbed jaw $b$ and the pivoted jaw $c$, in combination with the spring F, having the cam-surface $i$ and a flat portion, $h$, adapted to act upon the jaw $c$ to open it when the knotter is revolved in one direction and to close it when the knotter is reversed, and a spring-dog, G, for casting off the loop from the hooks, substantially as set forth.

In testimony whereof I have hereunto set my hand in the presence of subscribing witnesses.

PAUL HANSON.

Witnesses:
C. X. WASHBURN,
J. LIND.